Figure 3:
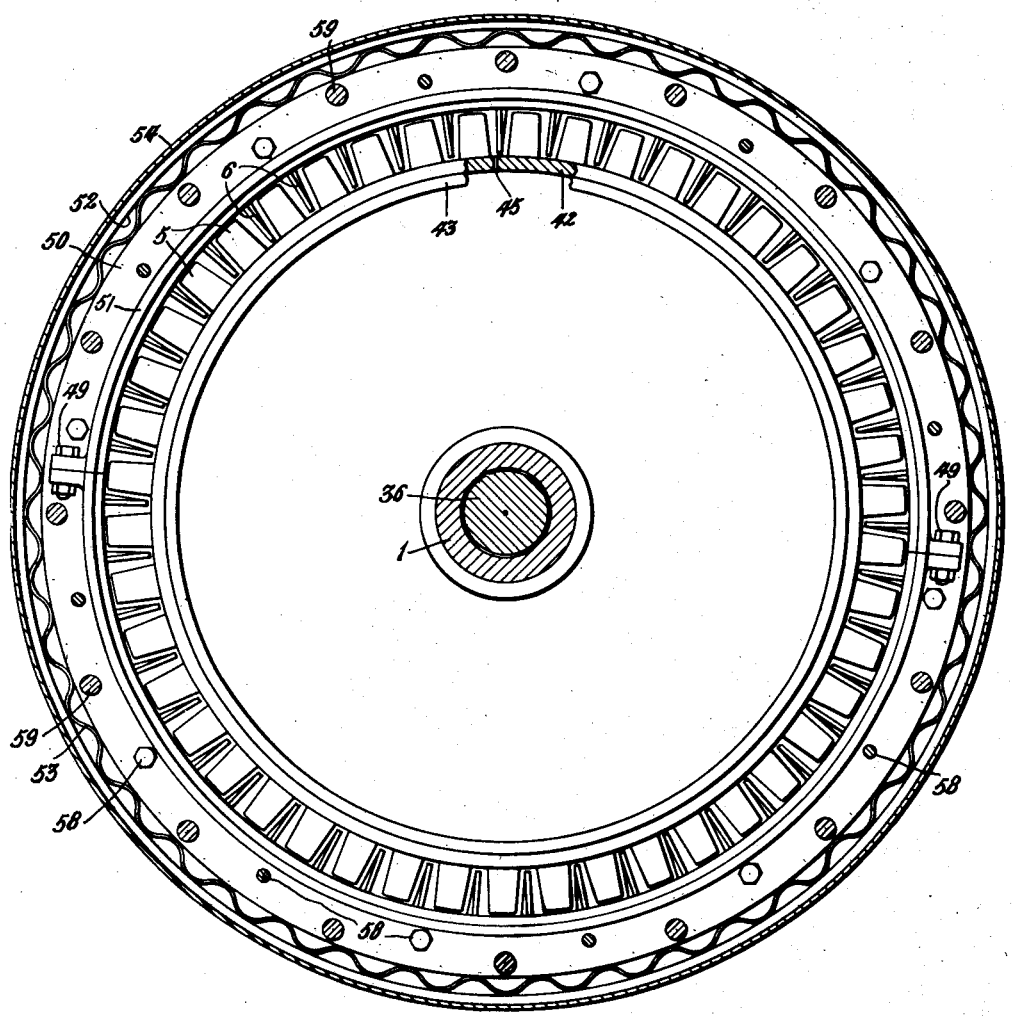

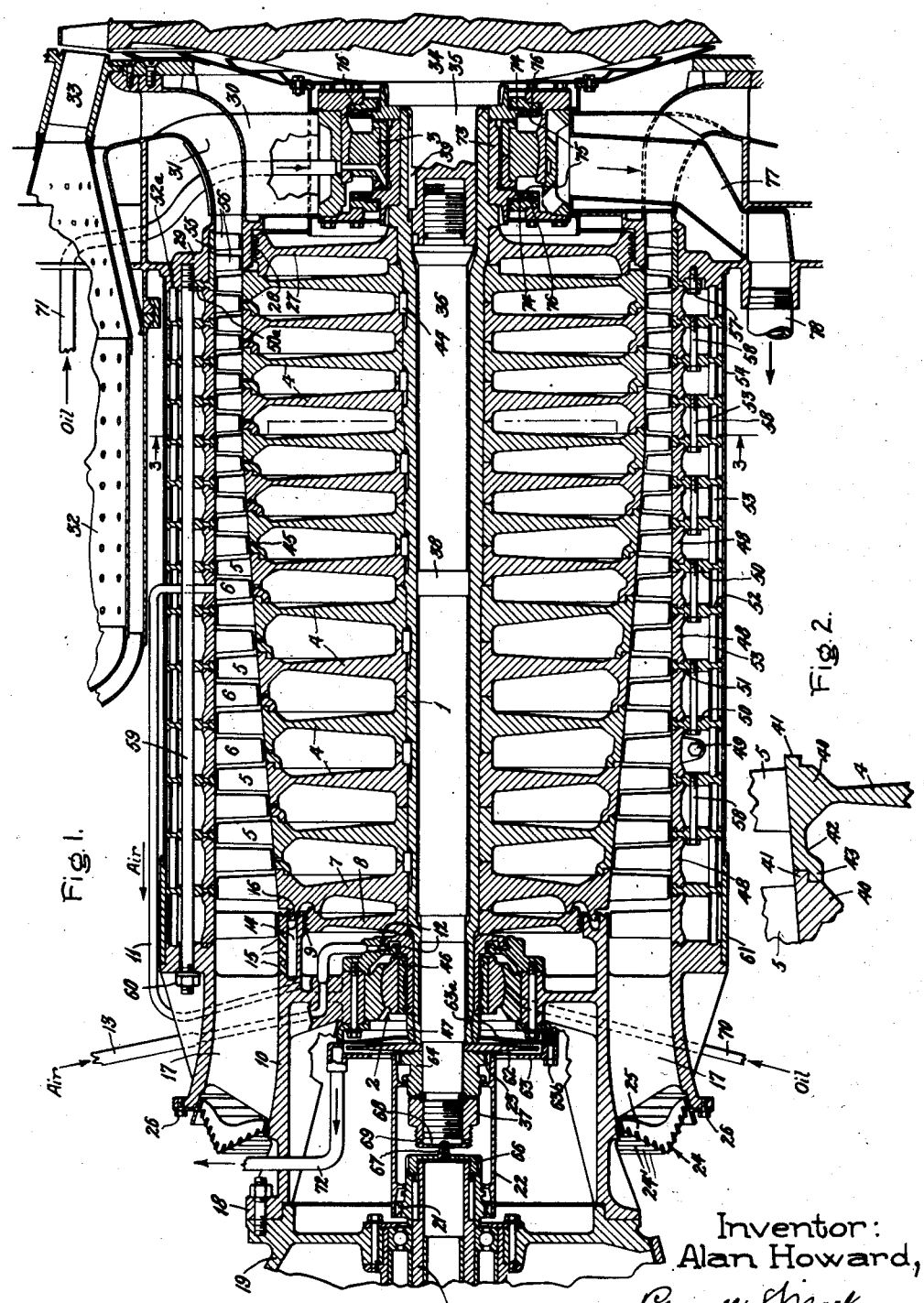

Sept. 16, 1952  A. HOWARD  2,610,786
AXIAL FLOW COMPRESSOR

Filed June 25, 1946  2 SHEETS—SHEET 2

Inventor:
Alan Howard,
by Prarell S. Mack
His Attorney.

Patented Sept. 16, 1952

2,610,786

UNITED STATES PATENT OFFICE 2,610,786

AXIAL FLOW COMPRESSOR

Alan Howard, Schenectady, N. Y., assignor to General Electric Company, a corporation of New York Application June 25, 1946, Serial No. 679,247

1 Claim. (Cl. 230—133)

My invention relates to the construction and arrangement of a multistage axial flow compressor. While not limited thereto, it is especially adapted for use in connection with gas turbine power plants, specifically those for the propulsion of aircraft.

This is a continuation-in-part of my application Serial No. 506,930, filed October 20, 1943, now Patent Number 2,479,573.

An object of my invention is to provide an improved construction of axial flow compressor which is light in weight, comparatively easy to assemble, and having the necessary rigidity when used as a component part of a compact integral gas turbine power plant.

Another object is to provide an improved construction for the casing of a multi-stage axial flow turbo-machine.

A further object is to provide a turbo-machine of the type described having an improved arrangement of the discs which carry the moving blades.

A still further object is to provide an improved arrangement for balancing the axial thrust on an axial flow compressor rotor.

Other objects and advantages will appear from the following description taken in connection with the accompanying drawings, in which Fig. 1 is a sectional assembly view showing a complete axial flow compressor built in accordance with the invention; Fig. 2 is a detail view of the joint between two adjacent compressor disks; and Fig. 3 is a sectional view taken on the plane 3—3 in Fig. 1.

The construction of a multi-stage axial flow compressor for use in aircraft power plants presents a number of problems not encountered in the construction of similar machines for land or marine use. Because of the very considerable length of the machine, the exterior casing must be extremely rigid, particularly if it is intended to serve as the "main frame" of a complete gas turbine power plant, serving to support other components such as an accessory drive section, combustion chambers, and others. Of course, for aircraft application it must be of minimum weight. Because efficiency is of prime importance in a gas turbine power plant and because such a power plant for aircraft application must perform satisfactorily over an extremely wide range of difficult operating conditions, it should be possible to easily disassemble the compressor for frequent cleaning, inspection, and other servicing.

The present invention comprises an axial flow compressor arrangement which has been found to meet satisfactorily the many rigid requirements for such a turbo-machine for aircraft power plants.

Referring now to Fig. 1, the compressor has a rotor consisting of a hollow quill shaft 1 supported at one end by a plain journal bearing 2, and at the other end by a combined thrust and radial self-aligning journal bearing 3. Keyed to quill shaft 1, in a manner which will be obvious from Fig. 1, are a plurality of disks 4 each having a circumferential row of blades or buckets 5. The arrangement shown has 14 of such bucket-wheels, each cooperating with a stationary row of blades 6 to constitute one stage of compression. The bucket-wheels of the first seven or eight stages may be made of a light weight alloy, such as forged aluminum or magnesium. The buckets 5 may be made either of a light weight forged alloy or of stainless steel or other suitable material. At some intermediate stage of compression, the operating temperatures will rise to such a value that it becomes impracticable to use aluminum or magnesium alloys; hence the bucket-wheels of the subsequent stages must be fabricated of a suitable alloy steel.

At the front end of the rotor, between the first stage wheel 7 and the front bearing 2 is a disk 8 which forms a balancing piston for counteracting the aerodynamic thrust produced by the action of the blades 5 on the fluid flowing through the machine. The disk 8 is provided with circumferential grooves forming a labyrinth seal 9 with the front compressor casing 10. Air at the pressure required to produce the necessary balancing force on disk 8 is bled by means of a conduit 11 from a suitable intermediate stage of the compressor to the sealed space defined by the disk 8, front casing 10, and the sealed housing of bearing 2.

The rearward side of bearing 2 is provided with an oil seal consisting of two axially spaced labyrinth seals 12 to the space between which is supplied air under pressure through conduit 13. The air in conduit 13 is taken from a higher stage of compression than that supplied to conduit 11, so that the air will tend to flow from the seal 12 into the balancing chamber associated with disk 8, rather than in the opposite direction. Air leaking from the balancing chamber through seal 9 collects in an annular chamber 14 from whence it is bled through a plurality of axially and circumferentially spaced nozzles 15 into the inlet to the first stage. Nozzles 15 may consist of holes drilled at an angle such that the fluid issuing from them will enter the main compressor flow with a minimum disturbance thereof. It will also be seen that the first bucket-wheel 7 is provided with a labyrinth seal 16 to insure that fluid in chamber 14 will pass through the nozzles 15 rather than through the clearance space between wheel 7 and the casing.

The front end casing 10 may consist of a single casting of aluminum or magnesium alloy which serves a number of functions. It forms the support for the front bearing 2, defines an annular compressor inlet passage crossed by three or more radially extending ribs 17. It also is provided with a circumferential flange 18 to which may be bolted a gear casing 19 having a shaft 20 adapted to be coupled in direct driving relation with the compressor rotor. To this end, the shaft 20 is provided with external gear teeth at 21 which cooperate with mating internal teeth in a coupling sleeve 22. Sleeve 22 is provided at its other end with a similar toothed coupling 23 in a manner which will be apparent from Fig. 1. Shaft 20 may drive a number of power plant accessories, such as starter motor, generator, fuel pump, etc. mounted on casing 19; and it may also deliver power to a propeller (not shown), for combined propeller and jet propulsion.

To prevent foreign objects entering the compressor inlet passage, a suitable screen 24 may be provided. In Fig. 1 this screen is represented as consisting of a plurality of radially extending struts 25 connected by a plurality of concentric annular vanes 24' secured in the leading edge of the struts. The screen may be secured to the front casing 10 by suitable threaded fastenings 26.

At the discharge end of the rotor, adjacent the last bucket wheel, is a disk 27 provided at its circumference with grooves forming a labyrinth seal 28 with the rear end casing 29. It may be noted that the rear or outer face of disk 27 is subjected to ambient atmospheric pressure. It will be understood that end casing 29 is provided with suitable radially extending ribs 30 supporting the rear bearing 3. Certain of these ribs may be hollow casings serving as conduits for oil lines, etc., as noted hereinafter. End casing 29 is provided with a cylindrical insert 55 which may carry one or more circumferential rows of stationary blades 56. While these blades may be designed to produce some diffusing effect, they are principally intended as guide vanes to straighten out the air flow to give it a uniform distribution and axial velocity into the discharge passage 31.

The rear end casing 29 also defines the annular discharge passage 31, which serves to conduct air from the last stage of the compressor to a plurality of combustors 32 circumferentially spaced around the outside of the compressor casing. The details of the combustors and the method of supporting them from the compressor casing are more fully described and claimed in the above-mentioned application Serial No. 506,930, now Patent Number 2,479,573. That application also describes more particularly the arrangement of the turbine nozzles 33 and the bucket wheel 34.

It will be noted that bucket wheel 34 is provided with a shaft portion 35 which projects into the end of quill shaft 1 and is threaded to shaft 36, which extends through quill shaft 1 and carries a nut 37 at its forward end. Shaft 36 may be provided with one or more circumferential lands 38 which serve to keep it accurately centered in the bore of quill shaft 1. Suitable spline or key means 39 may be provided for a positive driving connection between the turbine wheel 34 and the compressor quill shaft 1.

Referring now to Fig. 2 it will be seen that each compressor disk 4 has a rim portion 40 to which the buckets 5 may be secured by welding or any suitable type of mechanical connection, such as a dovetail joint (not shown). Each rim 40 is provided at one side with a minor axial extension 41 having an inner circumferential surface with a "reverse taper," being of a larger internal diameter adjacent the rim 40. At the opposite side, rim 40 is provided with a major axial extension 42 which bridges the space between adjacent rims 40 and is provided with a circumferential rabbet 43 having a reverse taper matching that of the cooperating rim portion 41. It will be seen that the outer surfaces of cooperating extensions 41, 42 serve to define the inner wall of the fluid flow paths formed by the stationary blades 6, both moving blades 5 and stationary blades 6 being of the shroudless type. In operation, centrifugal force tends to deflect the respective rim portions 42 outwardly, such deflection being prevented by the interengagement of the disk edge portions 41, 43. Thus portion 41 serves as a reinforcing ring for the extending portion 42. The friction force between edge portions 41, 43 helps to transmit the driving torque between adjacent disks, and it will be obvious that this friction force increases as speed increases and centrifugal force causes the edge portions to be pressed more tightly together.

In assembling the rotor, the rear end sealing disk 27 is first pressed into position on quill shaft 1 as shown in Fig. 1. The last stage bucket-wheel is next assembled and the key 44 driven into place. To assemble the next bucket wheel, the rim portion 41 and the mating portion 42 of the last stage bucket-wheel may be expanded and contracted respectively to permit the reversely tapered inner surface of portion 41 to slip over the cooperating portion 43 of the last stage wheel. This may be accomplished either by packing the rim portion 43 in a refrigerant such as solid carbon dioxide, or by heating the rim portion 41, or by a combination of both these shrink-fitting techniques in a manner which is well-known to those skilled in the art. The remaining bucket wheels are assembled to the quill shaft 1 in a similar manner.

Experience has shown that when assembling imperforate disks by the above-suggested shrink-fitting processes, air entrapped inside the closed space defined between adjacent disks may expand sufficiently to cause a certain amount of outward distortion of the rim portions 42. To prevent such deflection, at least one small air bleed port 45 (Fig. 1) is provided in each rim 42. While Fig. 1 shows all the ports 45 as being located in the same radial plane, it will be obvious that this is not necessary, as any random circumferential spacing of the ports 45 is satisfactory. The balance of the compressor rotor may be sufficiently critical that it will be desirable to arrange ports 45 with some definite preselected circumferential spacing.

After all the bucket-wheels 4 are assembled on quill shaft 1, then the front end balancing disk 8, front bearing sleeve 46, and retainer nut 47 may be assembled as indicated in Fig. 1.

The construction of the outer casing of the compressor may be seen by reference to Figs. 1 and 3. The stationary buckets 6 in each stage are carried by a split ring 48, which may be formed in two or more segments with their ends secured together by suitable threaded fastenings 49, as may be seen in Fig. 3. Between adjacent split rings 48 are radially extending one-piece rings 50, each of which has on opposite sides inner circumferential rabbets 51 and outer circumferential rabbets 52. Rabbet 51 receives the mating edge portion of the split ring 48, while the outer rabbet 52 provides a seat for a circumferential spacer member, which for the sake of lightness may take the form of a thin "corrugated" flat ribbon 53. Enclosing the circumference of rings 50 is a cylinder 54 of thin sheet material. This is not stressed, being employed for the sake of appearance only.

The method of assembling the compressor casing is as follows. The rear bearing 3 is assembled in the end casing 29, and guide vane carrier ring 55 is secured in place with suitable threaded fastenings 57. Then with the casing 29 in a horizontal position (with the axis of bearing 3 vertical), the quill shaft 1 complete with bucket wheels 4, end disks 8 and 27, and front bearing sleeve 46 and retainer nut 47, is lowered vertically so that the enlarged rear end portion of quill shaft 1 enters the bore in bearing 3. Next the two halves of the first split ring 48 are moved radially inward into the space between the blades of the last bucket wheel and the one next adjacent it. Fastenings 49 are then assembled to secure the halves of the split ring together, after which ring 48 is moved axially so that its circumferential edge portion fits into the rabbet 51 provided in the radially extending flange 50a formed integral with guide blade carrier ring 55. Then, after a spacer 53 has been inserted in the outer rabbet 52a of end casing 29, the first ring 50 can be passed axially over the rotor, from the inlet end thereof, and assembled with its rabbet 51 engaging the edge of the previously assembled ring 48, and with its outer rabbet 52 engaging the other edge of the first assembled spacer 53. The ring 50 is then secured to ring 50a by a plurality of circumferentially spaced bolts 58.

The split halves of the second stationary blade ring 48 are then likewise assembled radially, bolted together and moved axially until their edge portion engages the inner rabbet 51 of the previously assembled ring 50, with another spacer 53 assembled in the outer rabbet 52. Then another ring 50 can be assembled over the end of the rotor and secured with a row of bolts 58. By reference to Fig. 3 it will be seen that adjacent circumferential rows of bolts 58 are staggered relative to each other, as is necessary in order that each successive pair of rings 50 may be secured together by a circumferential row of bolts 58.

The above-described process is repeated until all the rows of stationary blades 6 have been assembled. The front end casing 10, complete with front bearing assembly 2 and labyrinth seal assembly 12 is assembled over the end of the shaft as indicated in Fig. 1. Then the long through-studs or tie-rods 59 are inserted through holes in the respective rings 50 and threaded into the rear end casing 29. It will be obvious that by tightening nuts 60 on tie-rods 59, the front and rear end casings with all the intermediate stationary casing rings stacked between are tightly clamped together to form a rigid integral frame.

The exterior casing wall 54 may be welded to a split ring 61 and assembled in two halves bolted together on a horizontal plane through the compressor axis, in a manner which will be obvious to those skilled in the art. It will be apparent that the casing 54 may also be formed of a single sheet of thin metal wrapped around the circumference of the rings 50 and held in position by suitable clamping bands (not shown).

With the compressor rotor and stationary casing assembled as described above, the turbine rotor may be assembled as indicated in Fig. 1, with the shaft 36 entering the bore of quill shaft 1 from the rear bearing end thereof. Then the centrifugal oil slinger disk 62 may be assembled to the end of shaft 36 projecting from the front bearing, after which the toothed coupling flange member 64 and retainer nut 37 may be added. A housing 63 and an annular shroud disk 63a, defining an annular chamber into which slinger disk 62 extends, is then secured by threaded fastenings 63b to the front end casing concentric with bearing 2. The coupling sleeve 22 can then be assembled axially to engage the gear teeth at 23. Accessory casing 19 may then be bolted to flange 18 with teeth 21 engaging the mating teeth of the front end portion of sleeve 22. It will be noted that the drive shaft 20 is hollow and is provided with a rear end cap 66 having a central extension 67 projecting through an opening in the adjacent end of nut 37. Nut 37 defines a chamber 68 with the end of shaft 36, and has a plurality of radial holes 69, for a purpose which will appear hereinafter.

While the specific type and arrangement of bearings is not essential to an understanding of the present invention, it may be noted that lubricating oil is delivered to the front bearing through a conduit 70 and suitable holes and grooves (not shown in detail) in the bearing. Likewise, lubricant may be supplied to the rear bearing through conduit 71, which is contained in a hollow rib 30. Oil is also furnished to the bore of accessory drive shaft 20 (by means not shown), some of which passes through the orifice in the shaft end cap 66 into chamber 68 defined by nut 37, from whence during operation it is thrown radially outward through holes 69 to lubricate the meshing teeth of the coupling sleeve 22.

It is not desirable that the front bearing 2 be flooded with an excess of oil draining rearward from the gear casing 19. To prevent such flooding, as for instance when the power plant operates with the front end of the shaft inclined upwardly, the centrifugal slinger disk 62 serves as a combined oil seal and scavenger pump. It will be apparent that oil draining into contact with either the front or rear face of disk 62 will be thrown radially outward into the annular chamber defined by housing 63. The pressure built up by centrifugal force in the whirling annulus of oil in housing 63 will cause the oil to be pumped out through conduit 72 to a lubricant storage tank or oil cooler (if included in the lubrication system), or directly to the lubricant feed pump (not shown). Thus, it will be seen that the disk 62 serves as a pump for scavenging the front bearing and as a barrier to prevent flooding of that bearing by oil from the gear casing 19 and self-aligning coupling 22.

In the rear bearing 3, the rotating journal member 73 is provided at either side of the bearing with an oil pumping flange 74. Shrouds 75 cooperate with the bearing housing to form annular centrifugal pump chambers from which oil is forced outward through a plurality of radial openings 76. The rotating flanges 74 serve as pumping means for scavenging the rear bearing and returning used lubricant through conduit 77 and pipe 78 to the lubrication system.

It will be apparent that the turbine rotor 34, 35, 36 can be readily disassembled from the compressor merely by removing the gear casing 19 and flexible coupling sleeve 22, nut 65, coupling member 64, scavenger pump housing 63 and pump disk 62. The bucket wheel 34 with its shaft 36 can then be removed axially from the quill shaft 1 without further disturbing the compressor assembly.

By my invention I have provided a novel form of turbo-machine rotor structure, with a built-up rotor and casing arrangement which is light in weight yet extremely rigid.

What I claim as new and desire to secure by Letters Patent of the United States, is:

In an axial flow turbo-machine having a fluid passageway, a stator comprising a plurality of coaxial sectional blade-carrying rings of equal internal diameter axially spaced from each other, a plurality of continuous radially extending rings having an internal diameter equal to that of said sectional rings, one of said continuous rings being located between each adjacent pair of sectional rings, each continuous ring having an inner annular rabbet adapted to engage a mating rabbet on the adjacent sectional ring and an outer annular recess, an annular axially extending spacer member disposed in said outer annular recess of adjacent continuous rings, and means including a plurality of circumferentially spaced tie-rods projecting through said continuous rings between the inner rabbets and outer annular recess for securely holding the sectional and continuous rings together in rigid interlocking relation to form a cylindrical outer boundary wall of the fluid passageway.

ALAN HOWARD.

REFERENCES CITED

The following references are of record in the file of this patent:

UNITED STATES PATENTS

| Number | Name | Date |
|---|---|---|
| 936,114 | Gardner | Oct. 5, 1909 |
| 995,358 | Lieber | June 13, 1911 |
| 2,028,603 | Heinze | Jan. 21, 1936 |
| 2,241,782 | Jendrassik | May 13, 1941 |
| 2,316,542 | Aldrich | Apr. 13, 1943 |
| 2,356,605 | Meininghaus | Aug. 22, 1944 |
| 2,410,769 | Baumann | Nov. 5, 1946 |
| 2,415,847 | Redding | Feb. 18, 1947 |
| 2,421,833 | Cronstedt et al. | June 10, 1947 |
| 2,450,671 | Loss | Oct. 5, 1948 |
| 2,458,149 | Cronstedt | Jan. 4, 1949 |
| 2,479,573 | Howard | Aug. 23, 1949 |

FOREIGN PATENTS

| Number | Country | Date |
|---|---|---|
| 458,200 | Germany | Mar. 15, 1928 |